United States Patent [19]

Garfinkel et al.

[11] Patent Number: 5,408,600
[45] Date of Patent: Apr. 18, 1995

[54] SYSTEM FOR DYNAMIC SHARING OF LOCAL AND REMOTE DISPLAYS BY MAINTAINING A LIST OF BEST-MATCH RESOURCES

[75] Inventors: Daniel Garfinkel, Fort Collins, Colo.; Stephen A. Louder, Pacific Grove, Calif.; Richard C. Wildman, Fort Collins, Colo.

[73] Assignee: Hewlett-Packard Company, Palo Alto, Calif.

[21] Appl. No.: 271,383

[22] Filed: Jul. 6, 1994

Related U.S. Application Data

[63] Continuation of Ser. No. 575,257, Aug. 30, 1990, abandoned.

[51] Int. Cl.⁶ ............................................. G06F 15/40
[52] U.S. Cl. ..................... 395/153; 395/600; 395/700; 364/DIG. 1; 364/225.6; 364/228.5; 364/232.3; 364/239.9; 364/260.4; 364/284
[58] Field of Search ......................... 395/153, 600, 700

[56] References Cited

U.S. PATENT DOCUMENTS

| | | | |
|---|---|---|---|
| 4,466,098 | 8/1984 | Southard | 371/9.1 |
| 4,833,596 | 5/1989 | Buckland et al. | 395/275 |
| 4,890,257 | 12/1989 | Anthias et al. | 395/275 |
| 4,982,344 | 1/1991 | Jordan | 395/157 |
| 5,008,853 | 4/1991 | Bly et al. | 395/153 |
| 5,038,301 | 8/1991 | Thoma, III | 395/153 |
| 5,046,027 | 9/1991 | Taaffe et al. | 395/153 |
| 5,072,412 | 12/1991 | Henderson, Jr. et al. | 395/159 |
| 5,073,933 | 12/1991 | Rosenthal | 380/25 |
| 5,097,411 | 3/1992 | Doyle et al. | 395/100 |
| 5,119,319 | 6/1992 | Tanenbaum | 364/514 |
| 5,119,494 | 6/1992 | Garman | 395/700 |
| 5,121,478 | 6/1992 | Rao | 395/157 |
| 5,233,687 | 8/1993 | Henderson, Jr. et al. | 395/158 |
| 5,280,583 | 1/1994 | Nakayama et al. | 395/200 |

OTHER PUBLICATIONS

McCartney, "Xcellence in Windows: Advantages of a Standard", *Mini-Micro Systems*, pp. 139–141 (Jul. 1987).
Scheifler, et al. "X Window System", *Digital Press*, Bedford USA, pp. XVII–XXIX (1988).

*Primary Examiner*—Thomas G. Black
*Assistant Examiner*—Wayne Amsbury

[57] ABSTRACT

A method and apparatus for sharing a local display signal from a local computer display to at least one remote computer display includes generating a connection with the display server associated with the remote computer display in response to a signal from the local workstation input device generating a remote display signal in relation to the local display signal in response to a second signal from the input device. The generation of the remote display signal involves dynamically creating a list of display resources for the remote computer display and generating the remote display signal in relation to the display resources and transmitting the remote display signal to the remote display server. Where the local display signal is shared among multiple remote computer displays, the generation of remote display signals creates a list of display resources for each of the remote computer displays, which list is updated for each rendering of the local display signal. In such a situation, the remote display signal for each remote computer display is generated in relation to the associated display resources. In one embodiment, the local display signal is a window based display signal, preferably X-windows. The generation of such a window based signal defines a window instance. Graphics contexts are dynamically allocated for each window instance and are stored remotely while identification information is stored locally.

32 Claims, 6 Drawing Sheets

SYSTEM FOR DYNAMIC SHARING OF LOCAL AND REMOTE DISPLAYS BY MAINTAINING A LIST OF BEST-MATCH RESOURCES

CROSS REFERENCE TO RELATED APPLICATION

This is a continuation of application Ser. No. 07/575,257, filed on Aug. 30, 1990, now abandoned.

FIELD OF THE INVENTION

The present invention relates generally to the field of generating computer screen displays and particularly to methods and apparatus for sharing computer displayed images among several computers.

BACKGROUND OF THE INVENTION

Computer display products are now available which allow the researcher or word processor to study or view various types of data on a computer screen. In order to utilize such products, a user typically would employ a computer, a display screen and some means of interacting with the computer, i.e., keyboard, mouse, graphics board, etc. Often it is desirable for two or more users to view the same screen display at the same time in different locations and for such users to each have the capability to make modifications to the screen display.

One type of computer display product which is becoming increasingly popular creates windows within a screen display, where data of interest is displayed within the window. The use of windows is advantageous because windows permit the concurrent, segregated display of different data on the same display screen. The computer programming which controls window generation and the data displayed within a given window is known as a window server. One particular window server which has become popular is the X-window server, such as the X-11 windowing program developed and openly distributed by the Massachusetts Institute of Technology in Cambridge, Mass.

It has been suggested in the past to share windows, i.e., to remotely display one or more of the windows displayed on a local computer screen and further to allow remote users to make modifications to the data displayed in such windows. In particular, it has also been suggested to share windows based upon the X Window System. Basically two approaches to sharing windows have been proposed, the centralized approach and the replicated approach.

In the replicated approach a copy of the application or program which is being served by the window server is duplicated for each remote location. To ensure that the various computer screens are displaying the same information, the input from each user is merged and presented to each copy of the application for display. The replication approach has the advantages of avoiding delays in the application output path and it allows each copy of the application to provide the best rendering for each display screen. However, since each copy of the application is running independently, consistency has been a problem. In addition, all copies of the application must be started at the same time, thereby disallowing any after-the-fact sharing.

In the centralized approach, one copy of the application is run through a process, known as a bridge, which transmits rendering commands to each remote user and which merges user input and presents the merged input to the application. Although the centralized approach allows users to be added after-the-fact, there is a performance delay in the output path associated with the use of only one application.

Consequently, there is a need for devices and methods which provide for the sharing windows, allow after-the-fact sharing and which do not suffer performance delays in the output path.

SUMMARY OF THE INVENTION

The advantages of the invention are achieved in a method and apparatus for sharing a local display signal from a local computer display to at least one remote computer display is shown to include generating a connection with the display server associated with the remote computer display in response to a signal from the local computer input device generating a remote display signal in relation to the local display signal in response to a second signal from the input device, wherein the generation of the remote display signal involves dynamically creating a list of display resources for the remote computer display and generating the remote display signal in relation to the display resources and transmitting the remote display signal to the remote display server. Where the local display signal is shared among multiple remote computer displays, the generation of remote display signals creates a list of display resources for each of the remote computer displays, which list is updated for each rendering of the local display signal. In such a situation, the remote display signal for each remote computer display is generated in relation to the associated display resources. In one embodiment, the local display signal is a window based display signal, preferably X-windows. The generation of such a window based signal defines a window instance. Graphics contexts are dynamically allocated for each window instance and are stored remotely while identification information is stored locally.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which.

DETAILED DESCRIPTION OF THE PREFERRED EMBODIMENT

Figure 1:
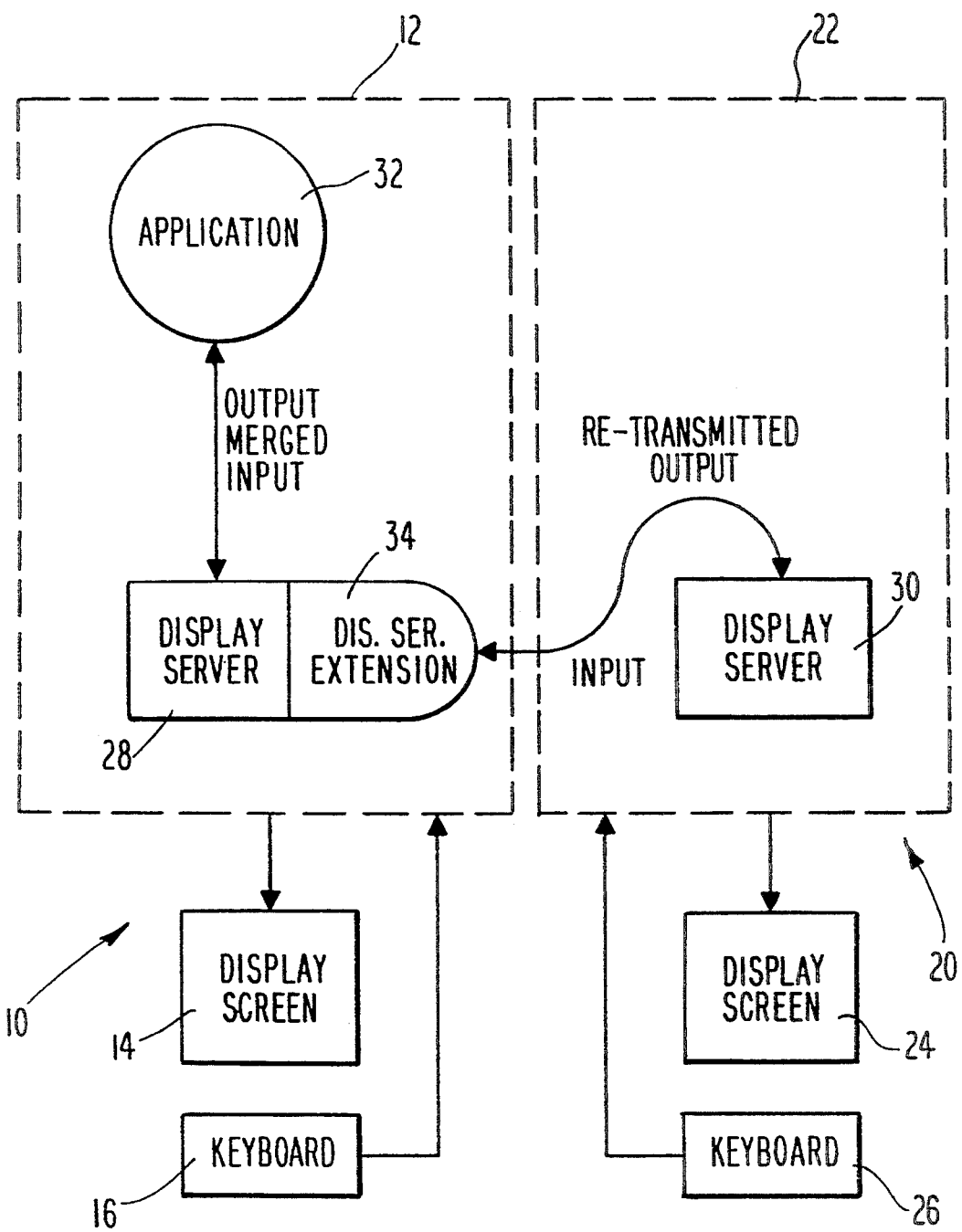
FIG. 1 is a diagrammatic view of a shared display device operated in accordance with the principles of the present invention.

A new and novel means for sharing a local display signal from a local computer display to at least one remote computer display is generally shown in FIG. 1.

A local computer display 10 includes a central processing unit (CPU) 12, a display screen 14, and an input device for keyboard 16. Remote computer display 20 includes a central processing unit 22, a display screen 24 and a keyboard 26. Both central processing units 12 and 22 each include a display server 28 and 30, respectively. An application or program 32 is also contained in CPUs 12 and is depicted as interacting directly with display server 28.

As will be understood by those familiar with computer displays, application 32 is generally a software based program which is loaded into the memory of CPU 12 for processing by the micro-processor device incorporated within the CPU. It will also be understood that display server 28 is generally a software program which processes the output of application 32 in the generation of a display signal to be displayed on screen 14. For example, if display servers 28 and 30 are window based display servers, the output of application 32 will be manipulated for display within one or more windows formed on display screen 14.

As indicated above, the present invention involves the sharing of display signals between computer display 10 and remote computer display 20. To this end, a display server extension 34 has been developed and is shown connected to display server 28. Extension 34 permits those display signals generated by application 32 and interpreted by server 28 to be shared among multiple computer displays. Generally, extension 34 accomplishes the sharing operation by interpreting and retransmitting the window system protocol generated by application 32 to remote server 30. As will be described in greater detail herein, display server extension 34 generates a connection with display server 30, generates a remote display signal in relation to the signal displayed on display screen 14, and transmits that signal to display server 30. It should be noted that remote server 30 need not include an instance of extension 34 in order to display a shared from local computer display 10.

In the preferred embodiment, display servers 28 and 30 are X window servers for which source code is available from the Massachusetts Institute of Technology in Cambridge, Mass., particularly, Protocol Version 11, Release 4. Also in the preferred embodiment, extension 34 is implemented in software which software, is written in "C" programming language.

Throughout this description, it is assumed that any communication which takes place between local and remote CPUs is achieved via any known and appropriate communication network utilizing known communication devices. In the preferred embodiment of the present invention, computer displays 10 and 20 can be any known computer display having a sufficient memory and speed for operating a display server and for communicating with other computer displays. The present invention has been implemented using HP9000 Series 300 computer equipment utilizing the HPUX operating system version 7.0 and TCP/IP Ethernet networking.

Figure 2:
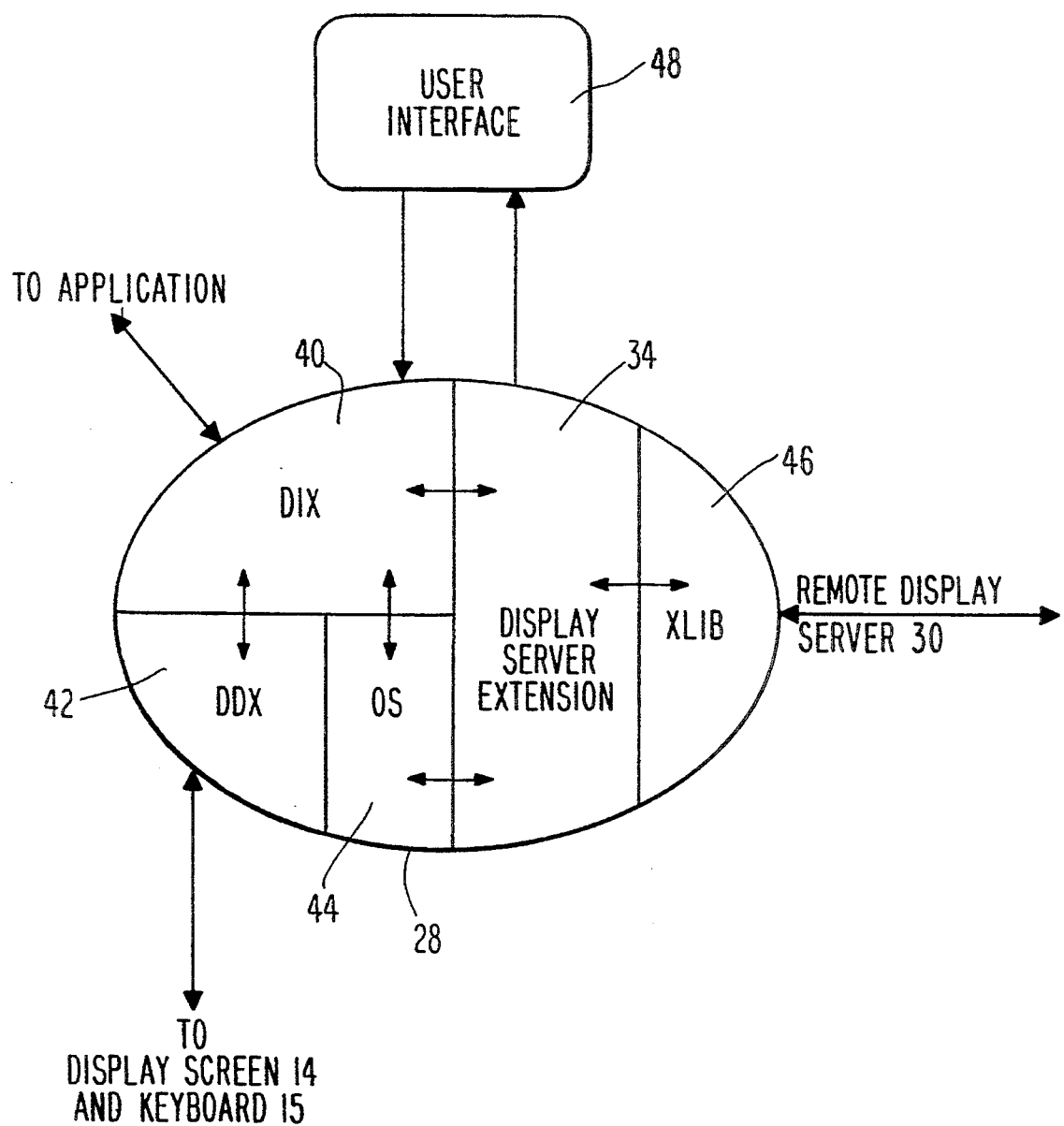
FIG. 2 is a more detailed diagrammatic view of the local window server, including the present invention, shown in FIG. 1.

Referring now to FIG. 2, the display server 28 and its relationship to the present invention is more particularly disclosed. It will be noted that hereafter the description of the invention is made in terms of the preferred embodiment, i.e., the embodiment which utilizes the MIT X-server. Display server 28 is seen to include three major components, namely, the device independent component (DIX) 40, the device dependent component (DDX) 42 and an operating system component (OS) 44. In normal operation, display server 28 receives commands from and communicates with application 32 via the device independent component 40. Signals which are device dependent, i.e., the display signal or the keyboard signal, are sent from or received by the device dependent component 42. The double ended arrows depicted in FIG. 2 indicate which components of display server 28 communicate with each other and which components of display server 28 communicate with display server extension 34. The communication between the components of display server 28 and with display server extension 34 are achieved in any known fashion, such as through the use of calls and events.

There is also shown in FIG. 2 an X library (Xlib) 46 connected to display server extension 34. As will be appreciated by those knowledgeable in the use of X windows, X library 46 is an available product used for communicating with X servers. In the preferred embodiment, display server extension 34 is built on Xlib 46 and Xlib 46 is the X library program available from Massachusetts Institute of Technology, Version 11, Release 4.

In operation, extension 34 shares those windows created by server 28 in response to a share command. In other words, if there has been an indication to share a window displayed on screen 14, all changes, modifications or renderings of that window will be shared by extension 34 to all remote computer displays designated to receive the shared display signal.

More particularly, in response to a command signal, extension 34 generates a connection with the display server associated with the remote computer display, i.e, display server 30, and generates a remote display signal in relation to the local display signal provided by DDX component 42. The generation of the remote display signal involves two operations. First, display server extension 34 dynamically creates a list of display resources for remote computer display 20. Thereafter, the remote display signal is generated in relation to the dynamically created list of display resources. Thereafter, the remote display signal is transmitted through X library 46 to remote display server 30. In this fashion, the desired display signal is transmitted utilizing X window protocol to multiple display screens. Dynamic creation of the list of display resources indicates that the list is created or updated for each rendering of the display signal.

A user interface 48 generates the command signal utilized by display server extension 34 to share the display signal. It is noted that signals from user interface 48 are provided to the device independent component 40 and that signals to interface 48 are provided from display server extension 34. A more detailed description of the share operation is made in relation to FIG. 3, and a more detailed description of the dynamic creation of the list is made in relation to FIG. 4.

Figure 3:
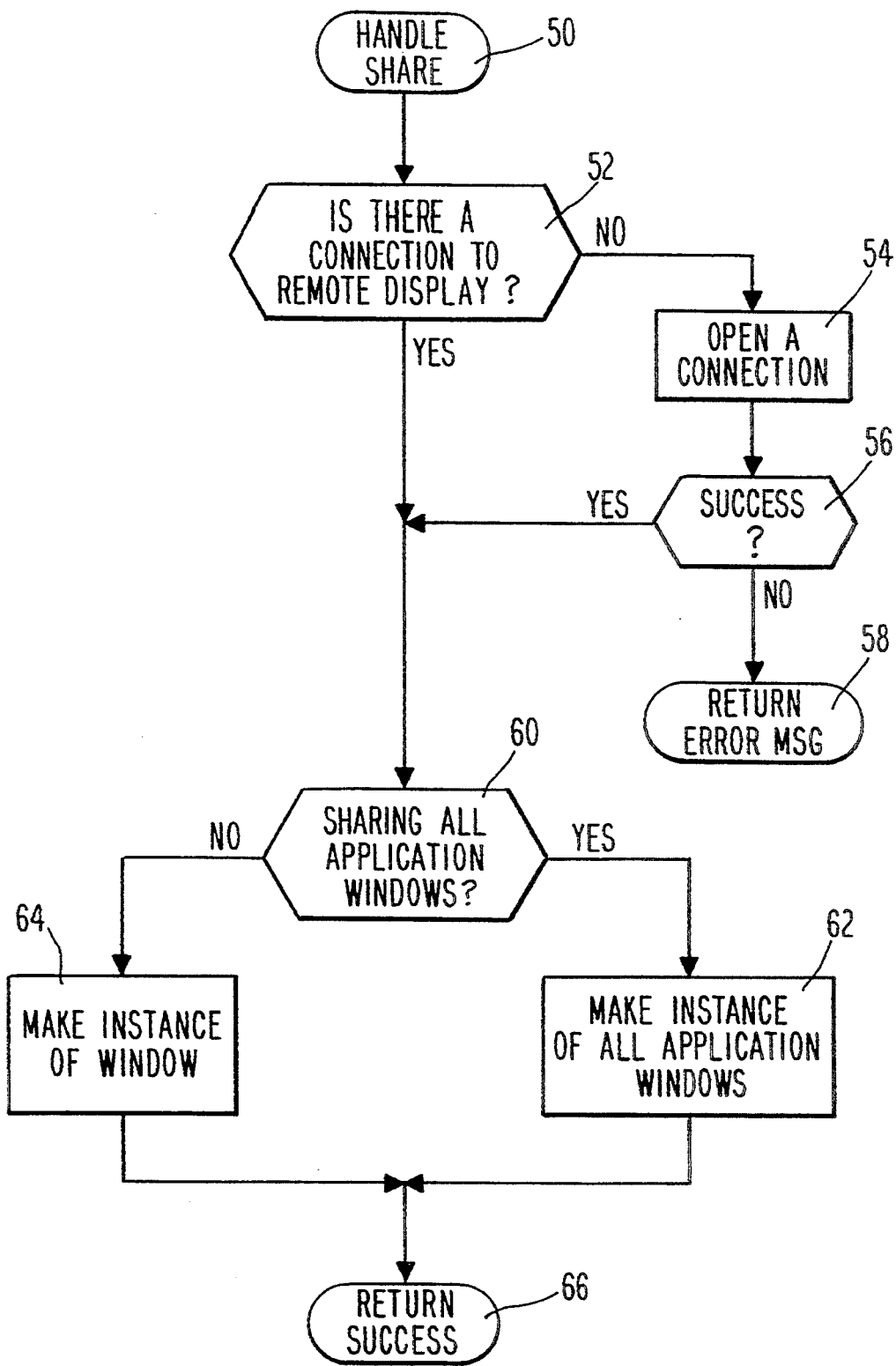
FIG. 3 is a flow chart depicting the operation of extension 34 in sharing a display signal.

Referring now to FIG. 3, the operation of extension 34 is depicted in relation to a sharing task. A share command is received at 50 resulting in extension 34 determining at 52 whether a connection to the designated remote display has been made. If it is determined that a connection has not been made the connection is opened at 54. Extension 34 determines at 56 whether the connection has been successfully made. If the connection has not been successfully made an error message is returned to user interface 48 at 58 indicting the lack of a connection. If it is determined that a connection was successfully made at 56 the programming of extension 34 next determines whether all application windows are being shared at 60. It will be noted at this point that the share command received at 50 will be indicative not only of an intent to share, but whether a single window is being shared or all windows associated with application 32. If it is determined at 60 that all application windows are being shared, an instance of all application windows is generated at 62. If it is determined that application 32 is not being shared, then an instance of the single designated window is made at 64. Instances created at 62 and 64 are processed through X library 46 and transmitted to all connections and a return success message is generated at 66 and provided to user interface 48.

Figure 4:
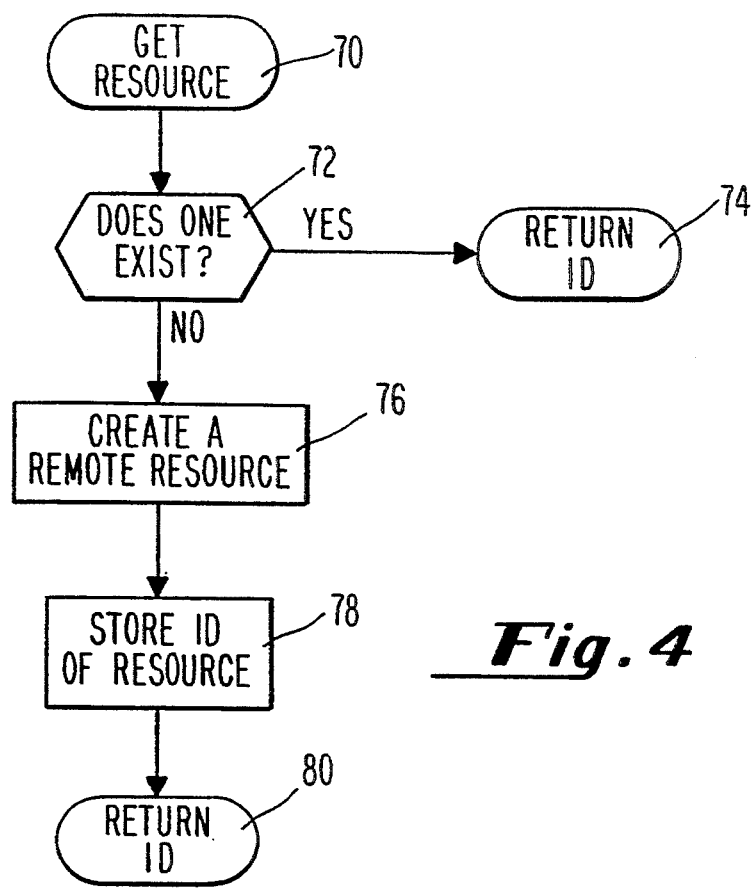
FIG. 4 is a flow chart of the operation of extension 34 in generating a list of display resources.

Referring now to FIG. 4, when the share command has been generated, display server extension 34 dynamically creates a list of display resources. Referring to FIG. 4, the list is dynamically created by first getting those resources necessary to display the signal being shared. The resources are obtained at 70 one at a time. A determination is made at 72 whether the resource being retrieved in fact exists at the remote computer display. If the resource exists an access identifier is returned to extension 34 at 74. If a remote resource necessary to share the display signal does not exist, that resource is created at 76. Created resources are stored in each of the remote computer displays. Access identifiers are stored by the local computer display so that such resources can be obtained and used when required. The access identifier associated with the resource created at 76 is stored locally at 78 and a return is generated at 80 indicating that an access identifier exists. The operation described in FIG. 4 is repeated until the access identifications have been obtained for all resources necessary to share the desired display signal. It is noted that the list of display resources is dynamically generated when the creation of each connection to a remote computer display whether one window or all windows of a particular application are to be shared.

The dynamic creation of display resources also results in the creation of graphic contexts. Display server extension 34 dynamically allocates graphic contexts for each local graphic context for each remote computer display. For example, one component of the graphics context is the font selection. Display server extension 34 allocates the font selection for each remote computer display as part of the graphic contexts for that remote computer display. If it is not possible to allocate the same font selection for the remote computer display, it is preferred that a font most closely resembling that utilized in the local computer display, be allocated. In other words, the list of display resources and/or graphics contexts are generated so that the image displayed at the remote computer is substantially identical to that image displayed at the local computer display.

Figure 5:
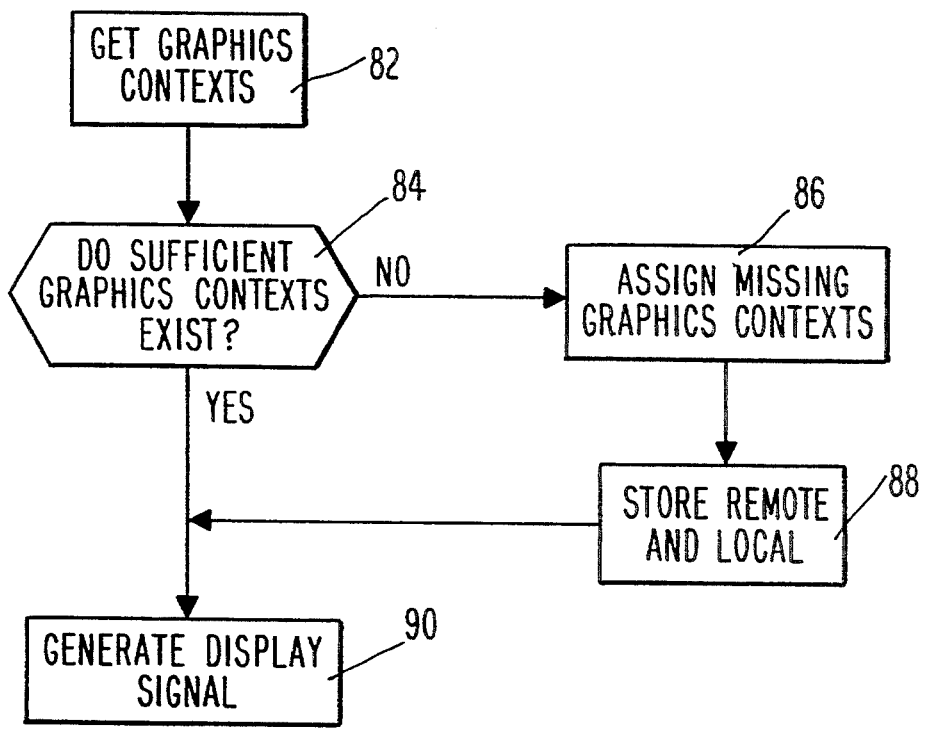
FIG. 5 is a flow chart of the operation of extension 34 in obtaining graphics contexts.

Referring now to FIG. 5, the graphics contexts retrieval and assignment process is shown in greater detail. When it is necessary to determine graphics contexts, i.e. whenever the display signal is to be rendered, the graphics contexts for each remote display are obtained at 82. The determination is made at 84 whether sufficient graphics contexts exist in order to display the designated windows. If sufficient graphics contexts do not exist, an assignment of missing graphics contexts is made at 86. Similar to the generation of display resources, the graphics contexts are stored in their respective remote computer displays at 88 and access identifiers are stored in local computer display 12. Once all missing graphics contexts have been stored remotely and access identifiers stored locally, the shared display signal is generated at 90. To this end, it is necessary that each computer display have a memory associated with the central processing unit. If a remote graphics context has not been assigned and if a sufficiently similar graphics context is not available, the window will not be shared and an error message will be sent to user interface 48.

As shown in FIG. 1, computer display 20 is provided with a keyboard 26. In the preferred embodiment of the present invention, the user who utilizes computer display 20 is able to make modifications of the data displayed in the shared window. In other words, each of the input devices 16 and 26 are capable of generating input events to be processed by application 32. In such a situation, display server extension 34 includes an input event controller which controls the input events to be processed by application 32. The input event controller determines which of the input devices will be capable of generating input events to be processed by the application. This is accomplished by defining either of the computer displays 10 or 20 as a current input instance. Only the current input instance can effect changes or modifications of the displayed signal. In one embodiment of the invention, the input event controller defines as the current input instance that computer display which is currently generating input events. In another embodiment of the invention, the input event controller includes a timer for measuring the time elapsed between generation of input events by the current input instance. In that embodiment, the input event controller will not redefine the current input instance until a preselected time period has elapsed from the generation of the last input event.

Figure 6:
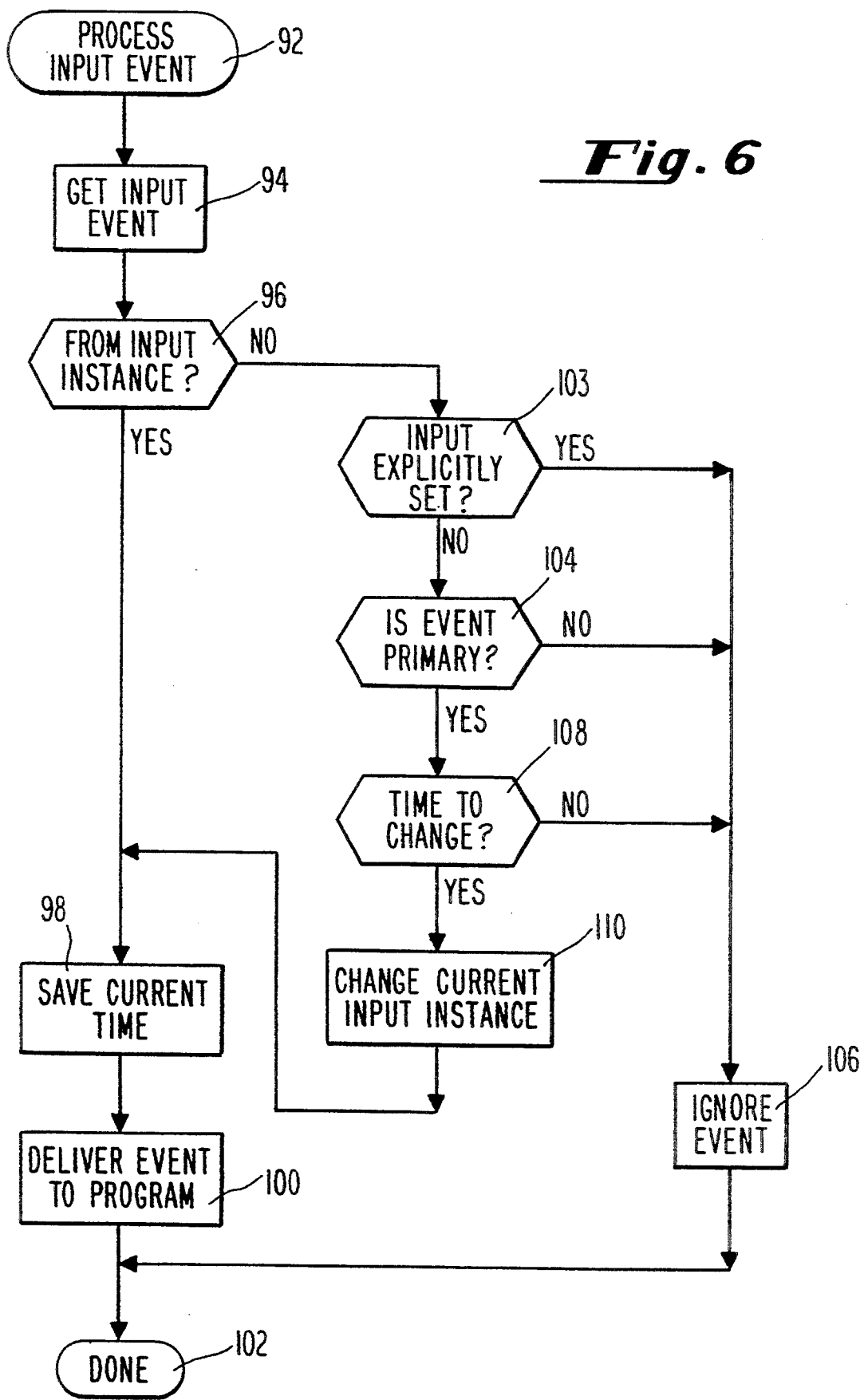
FIG. 6 is a flow chart of the operation of extension 34 in controlling input events generated by remote computer displays.

A more detailed explanation of the input event controller is contained in FIG. 6. Processing of input events is begun at 92. Input events are obtained at 94 and a determination is made at 96 whether the input event is from the current input instance. If the input event is from the current input instance, the current time is saved at 98 and the event is delivered to application or program 32 at 100. At this point, the input event controller is done at 102 and remains idle until receiving another indication to process input events at 92. If it is determined at 96 that the input event is not from the current input instance, a determination is made at 103 whether the current input instance has been explicitly set by user interface 48. If the current input instance has been explicitly set, the input event is ignored at 106 and the event controller returns to 102. If it is determined that the current input instance has not been explicitly set by user interface 48, a determination is made at 104 whether the input event is a primary input event. If it is determined at 104 that the input event is not a primary input event, the event is ignored at 106 and the event controller returns to 102. If it is determined at 104 that the input event is a primary event, the determination is made at 108 whether sufficient time has elapsed to change the current input instance to that computer display which generated the primary event. The determination at 108 is made by comparing the current time to the current time which was saved in 98. If the difference does not exceed a predetermined value, the primary input event is ignored at 106. If the difference does exceed a predetermined time period, the current input instance is changed at 110 to the computer display which generated the primary event. The current time is thereafter saved at 98 and the primary event is delivered at 100 to application of program 32. It will be noted that if the predetermined time is set at zero the current input instance will in effect be automatically changed to whatever computer display is generating a primary event.

Figure 7:
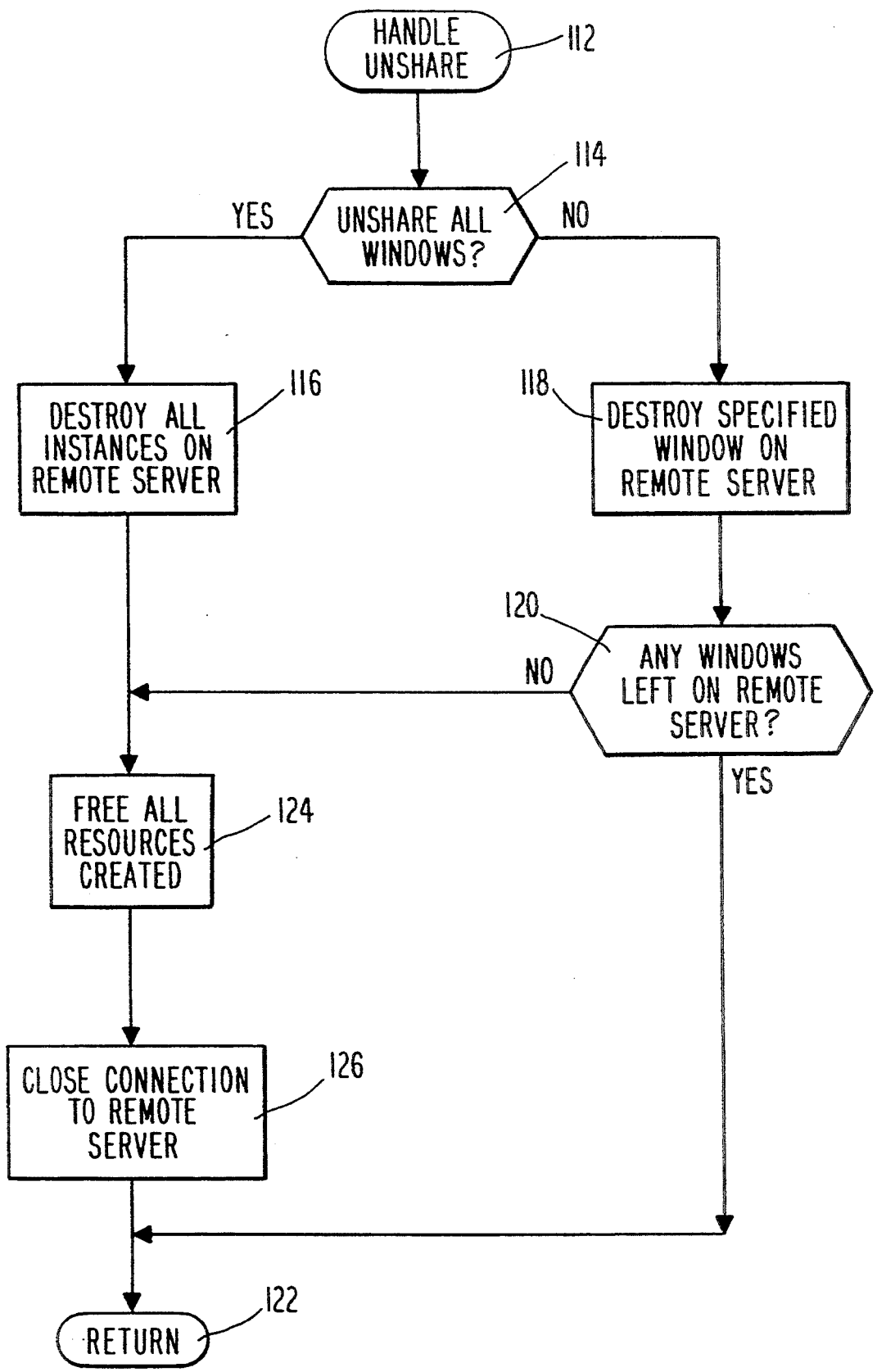
FIG. 7 is a flow chart of the operation of extension 34 in the unsharing of a display signal.

Display server extension 34 also comprises a terminator for terminating the sharing of a particular window or for terminating the sharing of all windows at a particularly remote computer display. Operation of extension 34 in a relation to the termination of share display signals is shown in greater detail in FIG. 7. The command to unshare the window is received at 112. In response to this command, determination is made at 114 whether all windows are to be unshared. If all windows are to be unshared, all instances of those windows on the remote server are destroyed at 116. If less than all windows are to be unshared, the particular windows specified are destroyed on the remote server at 118. A determination is made at 120 whether any windows remain on the remote server. If windows remain on the remote server, the unshare operation is concluded at 122. If no windows remain on the remote server either as determined at 120 or as destroyed at 116, the display resources previously created are freed at 124. All connection to the remote server is closed at 126. After closing the connection, the unshare operation is terminated at 122.

While the invention has been described and illustrated with reference to specific embodiments, those skilled in the art will recognize that modification and variations may be made without departing from the principles of the invention as described herein above and set forth in the following claims.

What is claimed is:

1. Apparatus for sharing a local display signal from a local computer display to at least one remote computer display, each computer display comprising a display screen and a central processing unit, wherein each central processing unit comprises a display server for displaying a display signal on said display screen, said local computer display further comprising an input device, said apparatus comprising:

a display server extension, connected to the display server associated with said local computer display, comprising a connector for generating a connection with the display server associated with said remote computer display in response to a first command signal, a signal generator for generating a remote display signal which substantially replicates the result of said local display signal in response to said first command signal, wherein the generation of said remote display signal comprises dynamically creating a list of available remote display resources for said remote computer display that most closely resemble the local display resources used in said local display signal and generating said remote display signal by translating the local display signal using said list of available remote display resources and a transmitter for transmitting said remote display signal to the remote display server using said connection; and a user interface, connected to the display server associated with said local computer display and connected to said input device, for generating said command signal.

2. The apparatus of claim 1, wherein the local display signal is shared among multiple remote computer displays, and wherein said display server extension dynamically creates a list of display resources for each of said remote computer displays, which list is updated for each rendering of the local display signal, and wherein a remote display signal is created for each of said remote computer displays in relation to the display resources associated with each remote computer display.

3. The apparatus of claim 1, wherein said local display signal comprises a window based display signal and wherein each of said display servers comprises a window server.

4. The apparatus of claim 3, wherein each window server is identical.

5. The apparatus of claim 4, wherein each window server comprises an X-window server.

6. The apparatus of claim 3, wherein said display server extension generates a remote display signal representative of one window displayed at said local computer display.

7. The apparatus of claim 3, wherein the display server associated with said local computer display is connected to an application, wherein said display server extension generates a remote display signal representative of all windows displayed in relation to said application.

8. The apparatus of claim 6, wherein said display server extension dynamically allocates graphics contexts for each local graphics context for each remote computer display.

9. The apparatus of claim 1, wherein said list of display resources are dynamically generated so that the image displayed at said remote computer display is substantially identical to the image displayed at said local computer display.

10. The apparatus of claim 1, wherein said remote computer display comprises a remote memory connected to each central processing unit wherein in relation to dynamically creating a list of display resources, said display server extension creates the list and causes the display resources for the remote computer display to be stored in said remote memory.

11. The apparatus of claim 10, wherein when said display server extension terminates sharing display signals with a remote computer display, the resources stored in such remote computer display are erased.

12. The apparatus of claim 1, wherein said display server extension further comprises termination means for terminating the sharing of a particular window at a particular remote computer display.

13. The apparatus of claim 1, wherein said display server extension further comprises termination means for terminating the sharing of all windows at a particular remote computer display.

14. Apparatus for sharing a local display signal from a local computer display to at least one remote computer display, each computer display comprising a display screen and a central processing unit, wherein each central processing unit comprises a display server for displaying a display signal on said display screen, said local computer display further comprising an input device, said apparatus comprising:

a display server extension, connected to the display server associated with said local computer display, comprising a connector for generating a connection with the display server associated with said remote computer display in response to a first command signal, a signal generator for generating a remote display signal which substantially replicates the result of said local display signal in response to said first command signal, wherein the generation of said remote display signal comprises dynamically creating a list of available remote display resources for said remote computer display that most closely resemble the local display resources used in said local display signal and generating said remote display signal by translating the local display signal using said list of available remote display resources and a transmitter for transmitting said remote display signal to the remote display server using said connection, wherein the display server associated with said local computer display is connected to an application, wherein said remote computer display further comprises an input device, wherein each of the input devices are capable of generating input events to be processed by said application resulting in a change to the image displayed at the local and remote computer displays, said display server extension further comprising, an input event controller for controlling which input events will be processed by the application; and a user interface, connected to the display server associated with said local computer display and connected to said input device, for generating said command signal.

15. The apparatus of claim 14, wherein said input event controller determines which of the input devices will generate input events to be processed by the application, by defining one of the input devices as a current input instance.

16. The apparatus of claim 15, wherein said input event controller defines as the current input instance that input device which is generating input events.

17. The apparatus of claim 16, wherein said input event controller comprises a timer for measuring the time elapsed between generation of input events by the current input instance, and wherein said input event controller will not redefine the current input instance until a preselected time period has elapsed from the generation of the last input event by the current input instance.

18. The apparatus of claim 15, wherein said input event controller defines the current input instance in response to a second command signal.

19. A method for sharing a local display signal from a local computer display to at least one remote computer display, each computer display comprising a display screen and a central processing unit, wherein each central processing unit comprises a display server for displaying a display signal on said display screen, said local computer display further comprising an input device, said method comprising the steps of:

generating a connection with the display server associated with said remote computer display in response to a first signal from said input device;

generating a remote display signal which substantially replicates the result of said local display signal in response to a second signal from said input device, wherein the generation of said remote display signal comprises dynamically creating a list of available remote display resources for said remote computer display that most closely resemble the local display resources used in said local display signal, and generating said remote display signal by translating the local display signal using said list of available remote display resources; and transmitting said remote display signal to the remote display server using said connection, whereby said remote display server is enabled to receive said remote display signal and update said remote display screen with said remote display signal.

20. The method of claim 19, wherein the local display signal is shared among multiple remote computer displays, and wherein said step of generating a remote display signal comprises the steps of creating a list of display resources for each of said remote computer displays, updating said list for each rendering of the local display signal and creating a remote display signal for each of said remote computer displays in relation to the display resources associated with each remote computer display.

21. The method of claim 19, wherein said local display signal comprises a window based display signal and wherein each of said display servers comprises a window server.

22. The method of claim 21, wherein each window server is identical.

23. The method of claim 22, wherein each window server comprises an X-window server.

24. The method of claim 21, wherein said step of generating a remote display signal comprises the step of generating a remote display signal representative of one window displayed at said local computer display.

25. The method of claim 24, further comprising the step of dynamically allocating graphics contexts for each remote computer display.

26. The method of claim 21, wherein the display server associated with said local computer display is connected to an application, wherein said step of generating a remote display signal comprises the step of generating a remote display signal representative of all windows displayed in relation to said application.

27. The method of claim 19, wherein the step of creating a list of display resources for each of said remote computer displays comprises the step of dynamically generating a list of display resources so that the image displayed at said remote computer display is substantially identical to the image displayed at said local computer display.

28. The method of claim 19, wherein said local computer display comprises a local memory connected to the central processing unit and wherein said remote computer display comprises a remote memory connected to each central processing unit wherein in relation to the step of dynamically creating a list of display resources said method further comprises the step of storing the display resources for the remote computer display in said remote memory and storing the location of said display resources in said local memory.

29. A method for sharing a local display signal from a local computer display to at least one remote computer display, each computer display comprising a display screen and a central processing unit, wherein each central processing unit comprises a display server for displaying a display signal on said display screen, said local computer display further comprising an input device, said method comprising the steps of:

generating a connection with the display server associated with said remote computer display in response to a first signal from said input device;

generating a remote display signal which substantially replicates the result of said local display signal in response to a second signal from said input device, wherein the generation of said remote display signal comprises dynamically creating a list of available remote display resources for said remote computer display that most closely resemble the local display resources used in said local display signal and generating said remote display signal by translating the local display signal using said list of available remote display resources; and transmitting said remote display signal to the remote display server using said connection, whereby said remote display server is enabled to receive said remote display signal and update said remote display screen with said remote display signal, the display server associated with said local computer display is connected to an application, wherein said remote computer display further comprises an input device, wherein each of the input devices are capable of generating input events to be processed by said application resulting in a change to the image displayed at the local and remote computer displays, said method further comprising the step of controlling which input events will be processed by the application.

30. The method of claim 29, wherein said step of controlling input events comprises the step of defining one of the input devices as a current input instance whereby only one of the input devices will generate input events to be processed by the application.

31. The method of claim 30, wherein said step of defining one of the input devices as a current input instance comprises the step of defining that input device which is generating input events as the current input instance.

32. The method of claim 31, wherein said step of defining one of the input devices as a current input instance comprises the steps of measuring the time elapsed between generation of input events by the current input instance and redefine the current input instance only after a preselected time period has elapsed from the generation of the last input event by the current input instance.

* * * * *